UNITED STATES PATENT OFFICE.

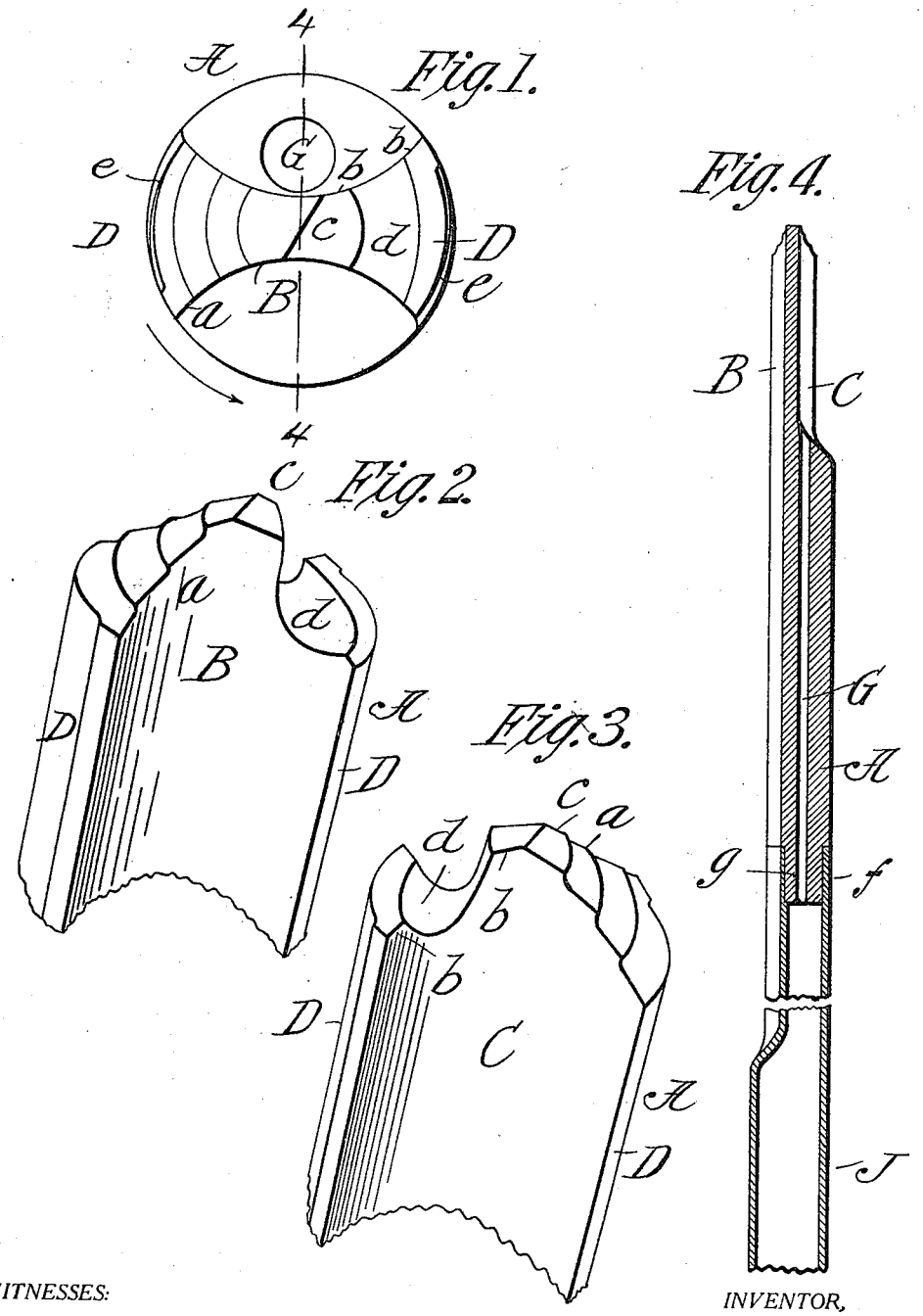

NAPOLEON L. AINS, OF CHICOPEE, MASSACHUSETTS.

DRILL FOR BORING GUN-BARRELS.

1,144,088. Specification of Letters Patent. Patented June 22, 1915.

Application filed March 11, 1915. Serial No. 13,699.

*To all whom it may concern:*

Be it known that I, NAPOLEON L. AINS, a citizen of the United States of America, and resident of Chicopee, in the county of Hampden and State of Massachusetts, have invented certain new and useful Improvements in Drills for Boring Gun-Barrels, of which the following is a full, clear, and exact description.

This invention relates to improvements in drills especially designed for the drilling of fire arm barrels, although the same is advantageously available for other work.

The objects of the invention are to provide a drill having at the end double cutting lips or edges whereby increased rapidity of work is possible; to provide a formation at the working end of the drill, across one of the cutting lips for the passage of oil or other lubricant so that from a single oil feeding duct the drill may be lubricated at all points where such is necessary or desirable; and to provide, by such formation, means for the clearance of the chips from one side of the drill to the other side thereof whereby the chips may be discharged along a single longitudinally ranging groove or channel in the drill at one side thereof.

The invention is described in conjunction with the accompanying drawings and is set forth in the claims.

Figure 1 is a plan view of the working end of the drill. Figs. 2 and 3 are perspective views of the working end portion of the drill as seen from opposite sides of the latter. Fig. 4 is a longitudinal sectional view through the drill as taken on line 4—4, Fig. 1.

In the drawings, A represents a drill bar to be produced from a cross sectionally round bar of steel, having at opposite sides thereof longitudinal channels B and C leading to its end, one of said side channels C having a lengthwise extent but partially that of the bar and relatively shorter than the channel B along the opposite side of the bar. The bar has its side portions D D between those reduced by the said channels B and C of convex or arc shape; and the said sides are convergent at the end c of the drill to the axis point thereof; and by being so made have cutting lips a and b at their respectively advanced or forward edges.

The convergent portion at the end of the drill including the cutting lip a is of a serrated or step shape, and the other convergent portion at the end of the drill in which the cutting lip b is included is traversed by a channel d which is offside from the axis of the drill bar and is at approximately a right or other substantial angle to the length of the drill bar. The said drill bar A has an oil duct G longitudinally therethrough which opens to the shorter one C of the sidewise located longitudinal channels.

The drill bar has its convex or arc shaped sides backed off or reduced from their forwardly advancing edges as indicated at e.

The drill bar A as described is combined with and to be carried by a tubular shank J with which the drill bar has a mortise and tenoned engagement,—the mortise or socket f being here represented as in the tubular shank, while the tenon g is formed as the rearward end portion of the drill bar. The drill comprising the drill bar and tubular shank as described when used has, as common in tools of this general character, a conduit for supplying oil or other lubricant therethrough.

The drill may be held stationary and the gun barrel to be bored thereby may be rotated, or the latter may be held stationary and the drill rotated; but in any event there is a relative movement as of the drill rotatively advancing in the work; and the chips produced by the cutting edge a will become, by reason of the step-shaped character thereof, separated or broken so that the discharge thereof down the longer longitudinal channel will be assured.

By the provision of the channel d, the oil carried through the longitudinal duct into the longitudinal groove or channel C, may, as well as lubricating the interrupted cutting lip b, also find passage to the place for lubrication of the diametrically opposite step-shaped cutting lip a; and, moreover, the chips produced under the working action of the interrupted cutting lip b will also, more or less assisted by the flow of oil, be carried by way of the transverse duct d across to the longer lengthwise extending channel B for discharge or clearance at the mouth of the bore being drilled in the gun barrel.

The longitudinal channel C is initially made in the drill bar comparatively short so that the distance from the orifice of the oil duct, terminating in said channel C for the working end of the drill is correspondingly short, lessening the liability of waist of oil by leakage across the arc shaped sides of the drill. The drill bar in only a portion of the length of which the channel C extends may after many regrindings, be milled or otherwise channeled further in its length toward the butt end of the drill bar, this being, practicably, more than once repeated until the bar has been practically used up and a new one replaced therefor in the tubular carrier shank or holder.

The practical and protracted use of the drill constructed as described for the work of boring gun barrels has been found to be much more rapid and economical than by the utilization of any drills for the corresponding purpose heretofore known to be used.

I claim:—

1. A drill bar having, at its opposite sides, longitudinal channels leading to its end, having arc shaped sides between the channels, said sides at the working end being convergent to the axis, and having cutting lips at their respectively advanced or forward edges, one of said convergent cutting-lip-including portions being traversed by a channel on a substantial angle to the length of the drill bar, and said bar having an oil duct longitudinally therethrough and opening to one of its sidewise located channels.

2. A drill bar having, at its opposite sides, longitudinal channels leading to its end, one of said side channels having a lengthwise extent but partially that of the bar, and relatively shorter than the other side channel, said bar having arc shaped sides between the channels, and said sides at the working end being convergent to the axis, and having cutting lips at their respectively advanced or forward edges, one of said convergent cutting-lip-including portions being traversed by a channel on a substantial angle to the length of the drill bar, and said bar having an oil duct longitudinally therethrough and opening to the shorter one of its sidewise located channels.

3. A drill bar having, at its opposite sides, longitudinal channels leading to its end, having arc shaped sides between the channels, which are "backed off" or reduced from their forwardly advancing edges rearwardly, said sides at the working end being convergent to the axis, and having cutting lips at their respectively advanced or forward edges, one of said convergent cutting-lip-including portions being traversed by a channel on a substantial angle to the length of the drill bar, and said bar having an oil duct longitudinally therethrough and opening to one of its sidewise located channels.

4. A drill bar having, at its opposite sides, longitudinal channels leading to its end, one of said side channels having a lengthwise extent but partially that of the bar, and relatively shorter than the other side channel, said bar having arc shaped sides between the channels, and said sides at the working end being convergent to the axis, and having cutting lips at their respectively advanced or forward edges, one of said convergent cutting-lip-including portions being of step shape, and the other of said convergent cutting-lip-including portions being traversed by a channel on a substantial angle to the length of the drill bar, and said bar having an oil duct longitudinally therethrough and opening to the shorter one of its sidewise located channels.

5. A drill-bar having, at its opposite sides, longitudinal channels leading to its end, having arc shaped sides between the channels, said sides at the working end being convergent to the axis, and having cutting lips at their respectively advanced or forward edges, one of said convergent cutting-lip-including portions being traversed by a channel on a substantial angle to the length of the drill bar, and said bar having an oil duct longitudinally therethrough and opening to one of its sidewise located channels, combined with a tubular carrier shank, with which the drill-bar has a mortise-and-tenon-engagement, the passage in the tubular carrier communicating with said longitudinal oil duct in the drill bar.

Signed by me at Springfield, Mass., in presence of two subscribing witnesses.

NAPOLEON L. AINS.

Witnesses:
G. R. DRISCOLL,
WM. S. BELLOWS.

Copies of this patent may be obtained for five cents each, by addressing the "Commissioner of Patents, Washington, D. C."